(12) United States Patent
Shackelford

(10) Patent No.: US 7,734,885 B2
(45) Date of Patent: Jun. 8, 2010

(54) EXECUTION OF POINT-IN-TIME COPY OPERATIONS IN CONTINUOUS MIRRORING ENVIRONMENTS

(75) Inventor: David Michael Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 11/763,385

(22) Filed: Jun. 14, 2007

(65) Prior Publication Data

US 2008/0313414 A1 Dec. 18, 2008

(51) Int. Cl.
*G06F 12/16* (2006.01)

(52) U.S. Cl. .............. 711/162; 711/161; 711/E12.103

(58) Field of Classification Search .................. None
See application file for complete search history.

(56) References Cited

U.S. PATENT DOCUMENTS

| 6,131,148 | A * | 10/2000 | West et al. ............... 711/162 |
| 6,253,295 | B1 * | 6/2001 | Beal et al. ............... 711/162 |
| 6,691,245 | B1 * | 2/2004 | DeKoning .................. 714/6 |
| 7,139,851 | B2 * | 11/2006 | Fujibayashi ............... 710/58 |
| 7,203,732 | B2 * | 4/2007 | McCabe et al. ............ 709/217 |
| 2004/0260899 | A1 | 12/2004 | Kern et al. |
| 2005/0071372 | A1 | 3/2005 | Bartfai et al. |
| 2005/0114465 | A1 | 5/2005 | Coronado et al. |
| 2005/0210320 | A1 | 9/2005 | Vincent |
| 2005/0268054 | A1 | 12/2005 | Werner et al. |
| 2006/0004889 | A1 | 1/2006 | Shackelford |
| 2006/0182020 | A1 * | 8/2006 | Factor et al. ............ 370/220 |
| 2008/0086608 | A1 * | 4/2008 | Kano .................... 711/162 |

FOREIGN PATENT DOCUMENTS

EP 1 349 088 A 10/2003

OTHER PUBLICATIONS

Sun Microsystems, Inc. "Sun StorageTek™ Availability Suite 4.0 Software Installation and Configuration Guide." Apr. 2006. Part No. 819-6147-10. Rev. A. pp. 18-19, 40-45.*

(Continued)

*Primary Examiner*—Reginald G Bragdon
*Assistant Examiner*—Nathan Sadler
(74) *Attorney, Agent, or Firm*—Rabindranath Dutta; Konrad Raynes & Victor LLP

(57) ABSTRACT

Provided are a method, system, and article of manufacture wherein a point-in-time copy operation command for a point-in-time copy of a point-in-time source volume to a point-in-time target volume is received while performing continuous copy operations from continuous copy source volumes to continuous copy target volumes. A determination is made as to whether the point-in-time target volume is a first continuous copy source volume and whether the point-in-time source volume is a second continuous copy source volume. A determination is made of metadata corresponding to the point-in-time copy operation, in response to determining that the point-in-time target volume is the first continuous copy source volume and the point-in-time source volume is the second continuous copy source volume. Point-in-time copy operations are performed on the continuous copy target volumes based on the determined metadata to execute the point-in-time copy operation command while performing the continuous copy operations.

20 Claims, 7 Drawing Sheets

OTHER PUBLICATIONS

Sun Microsystems, Inc. "Sun StorageTek™ Availability Suite 4.0 Remote Mirror Software Administration Guide." Apr. 2006. Part No. 819-6148-10. Rev. A. pp. 29-31.*

Sun Microsystems, Inc. "Sun StorageTek™ Availability Suite 4.0 Point-in-Time Copy Software Administration Guide." Apr. 2006. Part No. 819-6149-10. Rev. A. pp. 35-40 and 92-93.*

EMC Corporation. "EMC TimeFinder: Data Sheet." 2003. http://www.emc.com/products/product_pdfs/ds/timefinder_1700-4.pdf.*

Non-U.S. Response (Article 19 Amendment) dated Nov. 19, 2008 for PCT/EP2008/055162, 6 pp.

PCT International Search Report and Written Opinion dated Sep. 28, 2008 for Application No. PCT/EP2008/055162 filed Apr. 28, 2008.

\* cited by examiner

EXECUTION OF POINT-IN-TIME COPY OPERATIONS IN CONTINUOUS MIRRORING ENVIRONMENTS

BACKGROUND

1. Field

The disclosure relates to a method, system, and article of manufacture for the execution of point-in-time copy operations in continuous mirroring environments.

2. Background

In certain storage environments, asynchronous, continuous mirroring solutions may operate by copying updated data from a source storage subsystem to a target storage subsystem in a time-sequenced order, where the time-sequenced order is based on the time the data was updated by an application program. In such continuous mirroring solutions, source storage volumes, also referred to as continuous copy source volumes, are copied via continuous copy operations to target storage volumes, also referred to as continuous copy target volumes.

Point-in-time copy operations may attempt to copy source storage volumes, also referred to as a point-in-time source volumes, to target storage volumes, also referred to as point-in-time target volumes. In point-in-time copy operations, the point-in-time target volumes are updated with the data stored at the point-time-time source volumes at a single point-in-time. Furthermore, in point-in-time copy operations instantaneous or substantially instantaneous updates are made to the point-in-time target volumes with data from the point-in-time source volumes.

In certain situations, point-in-time copy operations have to be performed while continuous copy operations are being performed within a storage environment. Large scale point-in-time copies made onto a continuous mirror source volume (i.e., the continuous mirror source volume is the target volume for a point-in-time copy operation) may cause problems in certain storage environments because all the data included in the domain of the point-in-time copy may be logically updated instantaneously, and data consistency may be lost.

In certain existing implementations of continuous copy solutions, a record set may be created for each of the tracks updated by the point-in-time copy, wherein all of these record sets may have the same timestamp and may have to be physically copied to the continuous copy target volumes at the same time in order to maintain data consistency. Consistency can also be maintained by consecutively updating the continuous copy target volumes with the continuous copy source (i.e., point-in-time target) tracks, but this may prevent other application updates from being applied to the continuous copy target volumes until the entire range of the point-in-time copy is mirrored.

In certain customer environments where an entire data center is mirrored using continuous copy, in certain solutions the available choices for the customer are to disable mirroring while point-in-time operations are processed, or to not use point-in-time operations.

SUMMARY OF THE PREFERRED EMBODIMENTS

Provided are a method, system, and article of manufacture wherein a point-in-time copy operation command for a point-in-time copy of a point-in-time source volume to a point-in-time target volume is received while performing continuous copy operations from continuous copy source volumes to continuous copy target volumes. A determination is made as to whether the point-in-time target volume is a first continuous copy source volume and whether the point-in-time source volume is a second continuous copy source volume. A determination is made of metadata corresponding to the point-in-time copy operation, in response to determining that the point-in-time target volume is the first continuous copy source volume and the point-in-time source volume is the second continuous copy source volume. Point-in-time copy operations are performed on the continuous copy target volumes based on the determined metadata to execute the point-in-time copy operation command while performing the continuous copy operations.

In additional embodiments, performing the point-in-time copy operations on the continuous copy target volumes allows the point-in-time copy of the point-in-time source volume to be made to the point-in-time target volume without directly copying the point-in-time source volume to the point-in-time target volume.

In further embodiments, data consistency is maintained during the execution of the continuous copy operations, wherein the point-in-time copy operation command for a point-in-time copy of a point-in-time source volume to a point-in-time target volume is executed as a result of the performing of the point-in-time copy operations on the continuous copy target volumes.

In yet further embodiments, the metadata includes an identification of the point-in-time source volume, an identification of the point-in-time target volume, and extent information corresponding to the point-in-time source volume and the point-in-time target volume.

In additional embodiments, the point-in-copy command is executed while retaining data consistency during an execution of the continuous copy operations without freezing the continuous copy source volumes.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide a mechanism for enabling the use of point-in-time copy operations in a storage environment where continuous copy operations are being performed. In certain embodiments, instead of treating a point-in-time copy operation as a set of updates to many storage tracks all at the same time, the point-in-time copy operation itself is mirrored. To make this possible the point-in-time copy operation is considered a meta-update, in embodiments in which point-in-time copy operations are available as a capability on the continuous copy target volumes.

Figure 1:
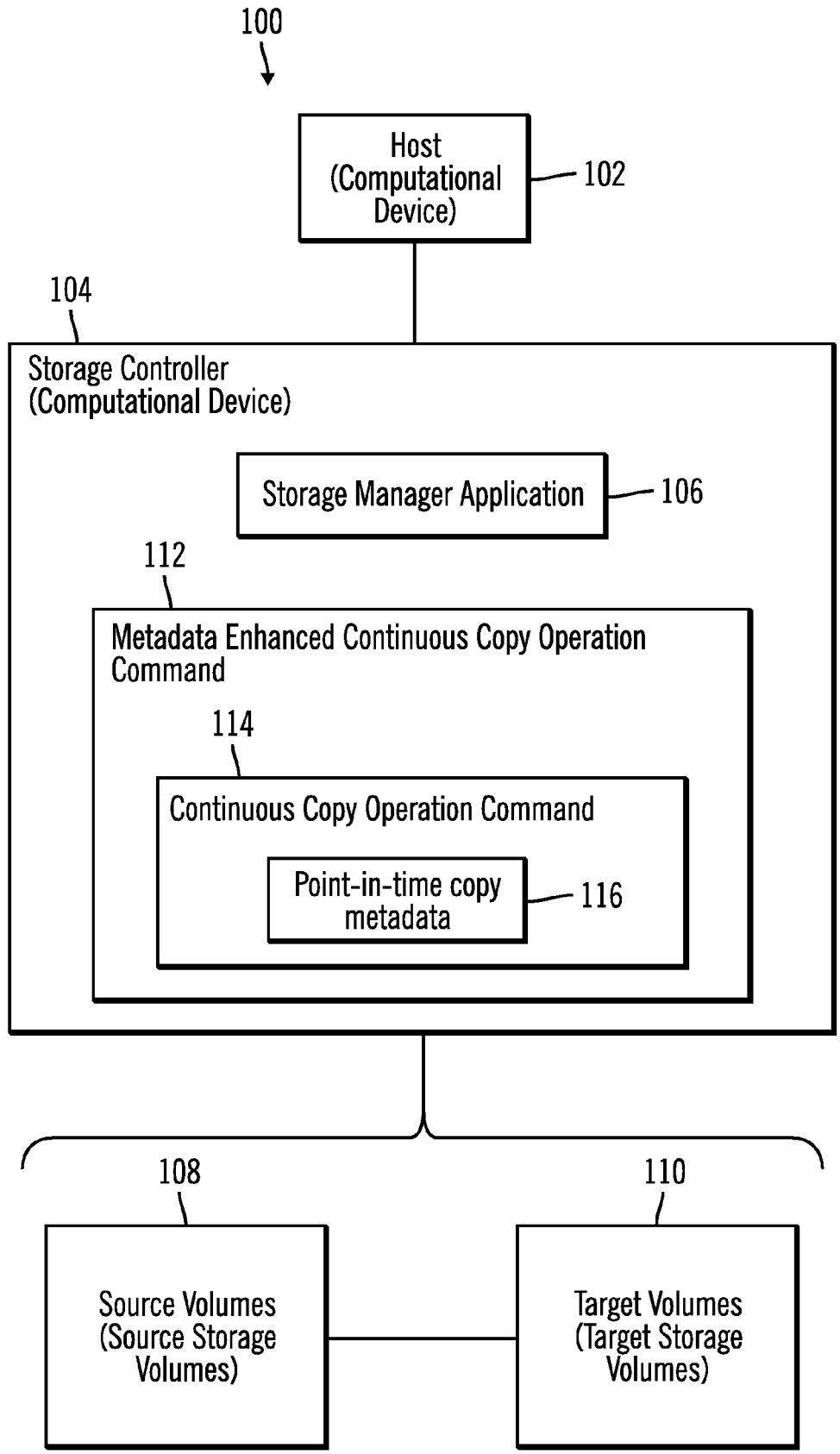
FIG. 1 illustrates a block diagram of a computing environment, in accordance with certain embodiments.

FIG. 1 illustrates a block diagram of a computing environment 100, in accordance with certain embodiments. In the computing environment 100, a host 102 is coupled to a storage controller 104, where a storage application 106 included in the storage controller 104 may copy source storage volumes 108 (also referred to as source volumes) to target storage volumes 110 (also referred to as target volumes). The source and target storage volumes 108, 110 coupled to the storage controller 104 may be configured as a Direct Access Storage Device (DASD), one or more RAID ranks, Just a bunch of disks (JBOD), or any other data repository system known in the art. While the storage volumes 108, 110 have been shown external to the storage controller 104, in alternative embodiments the storage volumes 108, 110 may be included in the storage controller 104. Furthermore, the storage volumes 108, 110 may be included in one site or in a plurality of sites.

The storage manager application 106 included in the storage controller 104 may be any suitable application implemented in software, hardware, firmware, or any combination thereof. The storage manager application 106 may copy source volumes 108 to target volumes 110 by using a metadata enhanced continuous copy operation command 112, where the metadata enhanced continuous copy operation command 112 may be a continuous copy operation command 114 that has been augmented with point-in-time copy metadata 116. The storage manager application 106 may also receive commands from the host 102 to update storage volumes 108, 110, where the commands received from the host 102 may include continuous copy commands and point-in-time copy commands.

In certain embodiments, the storage manager application 106 uses the metadata enhanced continuous copy operation command 112 to execute of point-in-time copy operations when continuous copy operations are in progress between the source volumes 108 and target volumes 110. Data consistency is retained during an execution of the continuous copy operations without freezing any continuous copy source volumes included in the source storage volumes 108.

Figure 2:
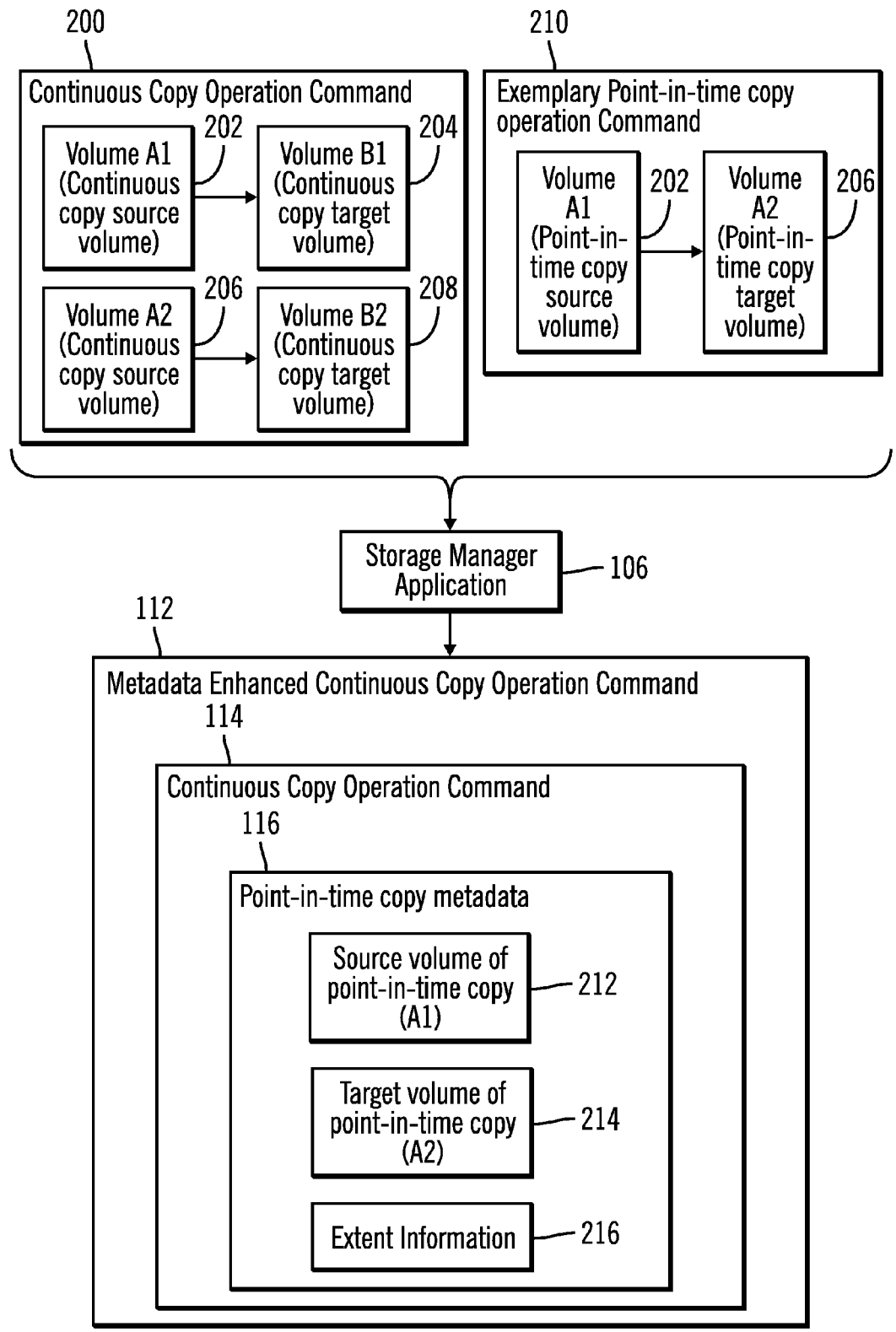
FIG. 2 illustrates a block diagram of a metadata enhanced continuous copy operation command, in accordance with certain embodiments.

FIG. 2 illustrates a block diagram of a metadata enhanced continuous copy operation command 112, in accordance with certain embodiments.

In FIG. 2, an exemplary continuous copy operation command 200 is shown. The exemplary continuous copy operation command copies a volume A1 202 to a volume B1 204 and also copies a volume A2 206 to a volume B2 208. Volume A1 202 and volume A2 206 are referred to as continuous copy source volumes, and volume B1 204 and volume B2 208 are referred to as continuous copy target volumes. Continuous copy relationships should be maintained while the continuous copy operation 200 is being performed, i.e., source volume A1 202 has to be updated before source volume B1 204 and source volume A2 206 has to updated before target volume B2 208.

In FIG. 2, an exemplary point-in-time copy operation command 210 is shown. The exemplary point-in-time copy operation command 210 is for copying the volume A1 202 to the volume A2 206. The volume A1 202 is also referred to as a point-in-time copy source volume and the volume A2 is 206 also referred to as a point-in-time copy target volume. It can be seen that the exemplary point-in-copy operation command 210 can destroy the continuous copy relationship via the point-in-time update to volume A2 206 from volume A1 202, while the exemplary continuous copy operation 200 is being executed. While it is possible to maintain the continuous copy relationship by freezing the volumes A1, A2 202, 206 prior to performing the point-in-time copy operation command 210, such a solution is undesirable because the freezing of the volumes A1, A2 202, 206 is disruptive to the execution of the continuous copy operation command 200.

The storage manager application 106 generates an enhanced continuous copy operation command 112 by augmenting a continuous copy operation command 114 with point-in-time copy metadata 116 extracted from the parameters of the exemplary point-in-time copy operation command 210. For example in certain embodiments the point-in-time copy metadata 116 may include the source volume of the point-in-time copy 212 (i.e., volume A1 202), the target volume of point-in-time copy 214 (i.e., volume A2 206), and corresponding extent information 216 that identifies tracks to be copied.

The storage manager application 106 uses the enhanced copy operation command 112 to simulate the result of the exemplary point-in-time copy operation command 210 by performing logical point-in-time copy operations from volume B1 204 to volume B2 208 in addition to previously performed point-in-time copy operations from volume A1 202 to volume A2 206.

Figure 3:
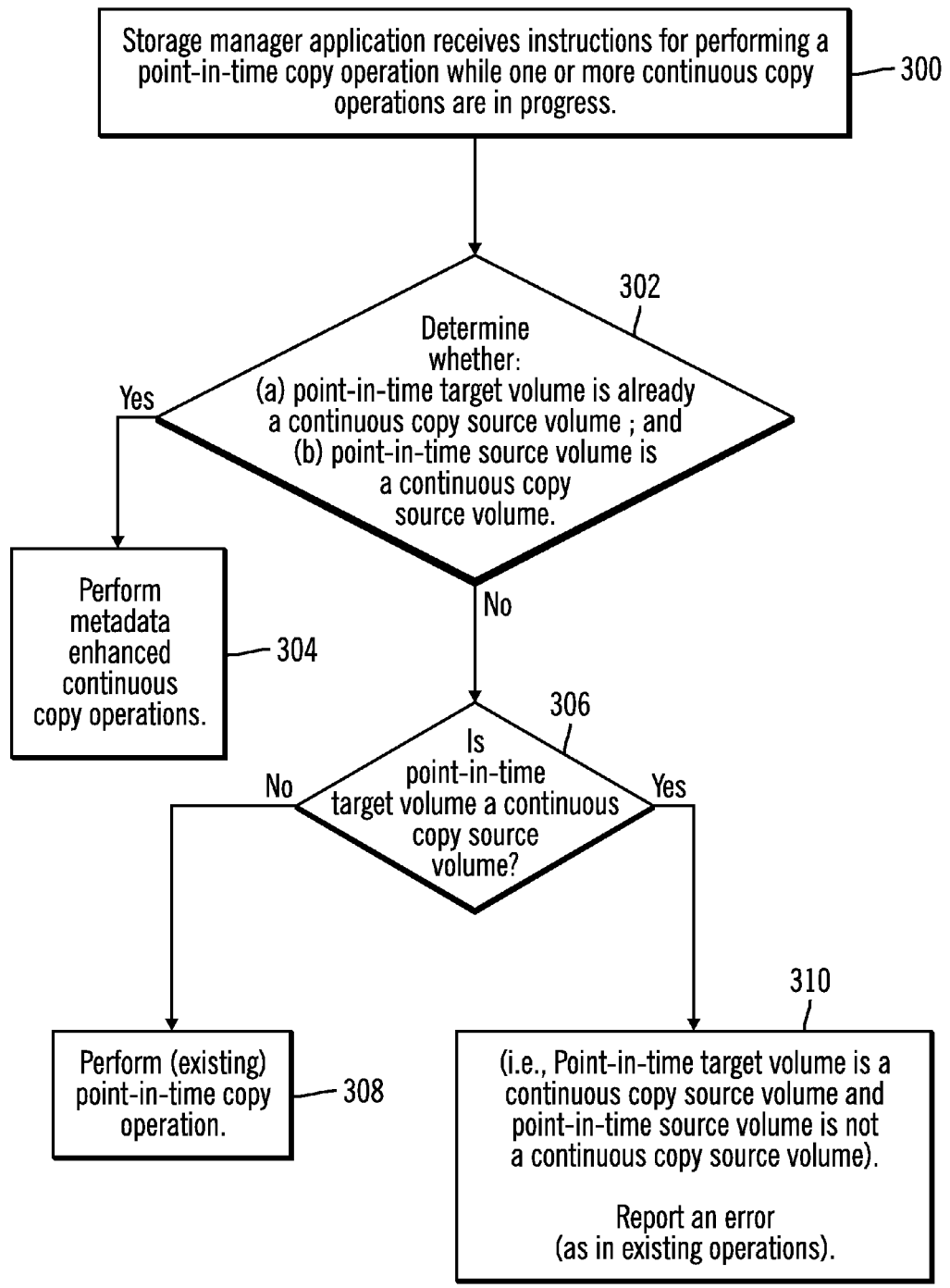
FIG. 3 illustrates first operations for performing point-in-time copy operations in continuous copy mirroring environments, in accordance with certain embodiments.

FIG. 3 illustrates first operations for performing point-in-time copy operations in continuous copy mirroring environments, in accordance with certain embodiments implemented by the storage manager application 106 in the computing environment 100.

Control starts at block 300, where the storage manager application 106 receives instructions for performing a point-in-time copy operation while one or more continuous copy operations are in progress. The storage manager application 106 determines (at block 302) whether a point-in-time target volume is already a continuous copy source volume, and a point-in-time source volume is a continuous copy source volume. If so, then the storage manager application 106 performs (at block 304) the metadata enhanced continuous copy operations command 112 to perform the updates of the point-in-time copy operations on the continuous copy target volumes.

If the determination is "No" at block 302, then control proceeds to block 306 where a determination is made whether the point-in-time target volume is a continuous copy source volume. If not, then existing point-in-time copy operations are performed (at block 308). If so, then the point-in-time target volume is a continuous copy source volume and the point-in-time source volume is not a continuous copy source volume, and an error is reported (at block 310).

Therefore, FIG. 3 illustrates certain embodiments, in which the metadata enhanced continuous copy operation 112 is performed in response to a determination that a point-in-time target volume is already a continuous copy source volume, and a point-in-time source volume is a continuous copy source volume.

Figure 4:
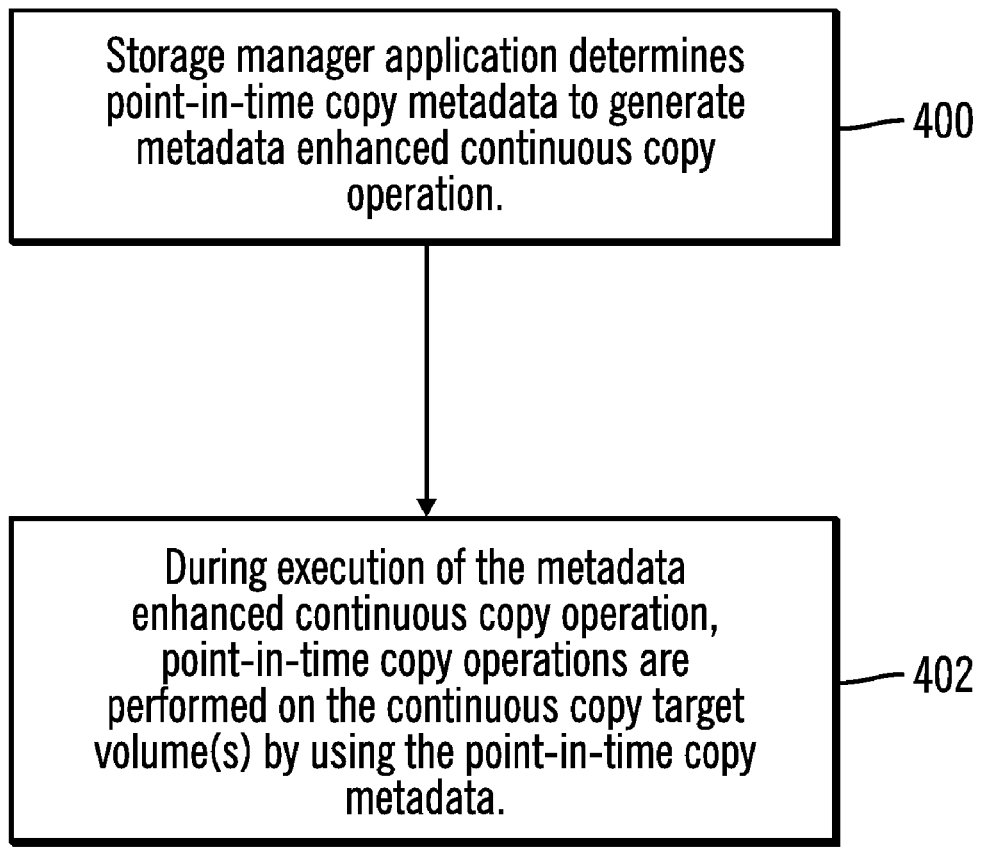
FIG. 4 illustrates second operations for performing point-in-time copy operations in continuous copy mirroring environments, in accordance with certain embodiments.

FIG. 4 illustrates second operations for performing point-in-time copy operations in continuous copy mirroring environments, in accordance with certain embodiments. The operations illustrated in FIG. 4 may be implemented in the storage manager application 106 of the computing environment 100. Control starts at block 400, where the storage manager application 106 determines point-in-time copy metadata 116 to generate the metadata enhanced continuous copy operation command 112. The storage manager application 106 ensures (at block 402) that during execution of the metadata enhanced continuous copy operation command, point-in-time copy operations are performed on the continuous copy target volume(s) by using the point-in-time copy metadata 116.

Figure 5:
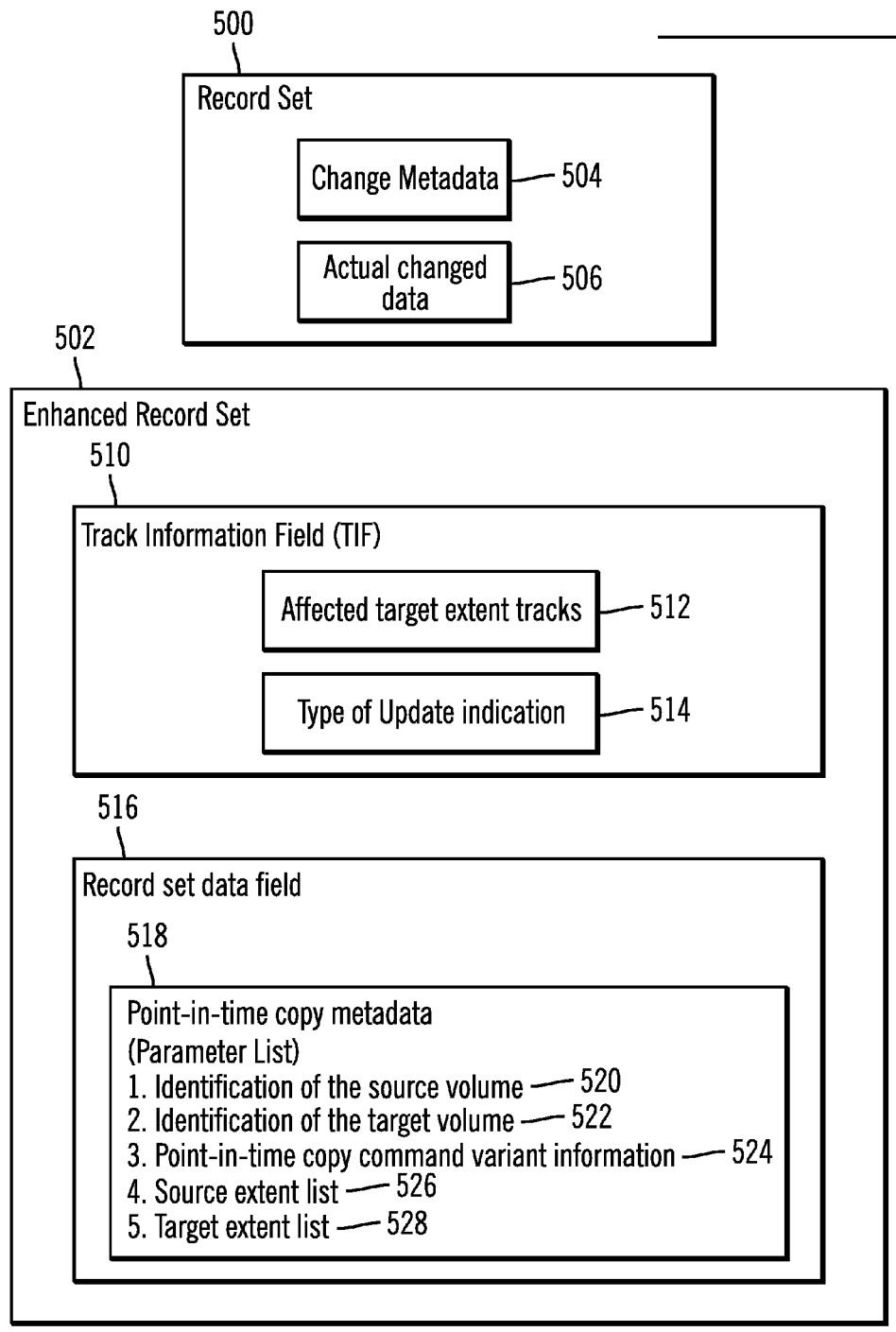
FIG. 5 illustrates a block diagram of a record set and an enhanced record set, in accordance with certain embodiments.

FIG. 5 illustrates a block diagram of an existing record set 500 and an enhanced record set 502, in accordance with certain embodiments as implemented in the storage controller 102 of the computing environment 100.

Certain existing continuous copy implementations transfer data between the source and target volumes of a continuous copy session by using a record set 500 including meta data about the change, referred to as change metadata 504, and the actual changed data 506. It is not desirable to transfer the full result of the point-in-time copy operation as individual track updates, so in certain embodiments a new type of record set, referred to as an enhanced record set 502 is used to perform the operations that are executed by the metadata enhanced continuous copy operation command 112. The enhanced record set 502 may be identified with the point-in-time copy target extents, and may include the following information:

1. A Track Information Field (TIF) 510 which identifies one of the target extent tracks as the affected track 512 and a new type of update indication referred to as "type of update indication" 514 indicating that the record is for a point-in-time copy parameter list. The TIF 510 may also include a data length showing the length of the point-in-time parameter list and some amount of overhead space for meta-information, a timestamp corresponding to the time when the point-in-time establish was performed, and the other fields showing that the record set is valid for application to the continuous copy target volume as "normal data".
2. A record set "data" field 516 including the point-in-time parameter list information 518 (also referred to as point-in-time copy metadata), which may include the identification of the source volume 520, identification of the target volume 522, point-in-time copy command variant information 524, source extent list 526, and target extent list 528.

Therefore, FIG. 5 illustrates certain embodiments in which the enhanced record set 502 is used by the metadata enhanced continuous copy operation command 112 to perform point-in-time copy operations while performing continuous copy operations without freezing source volumes.

Figure 6:
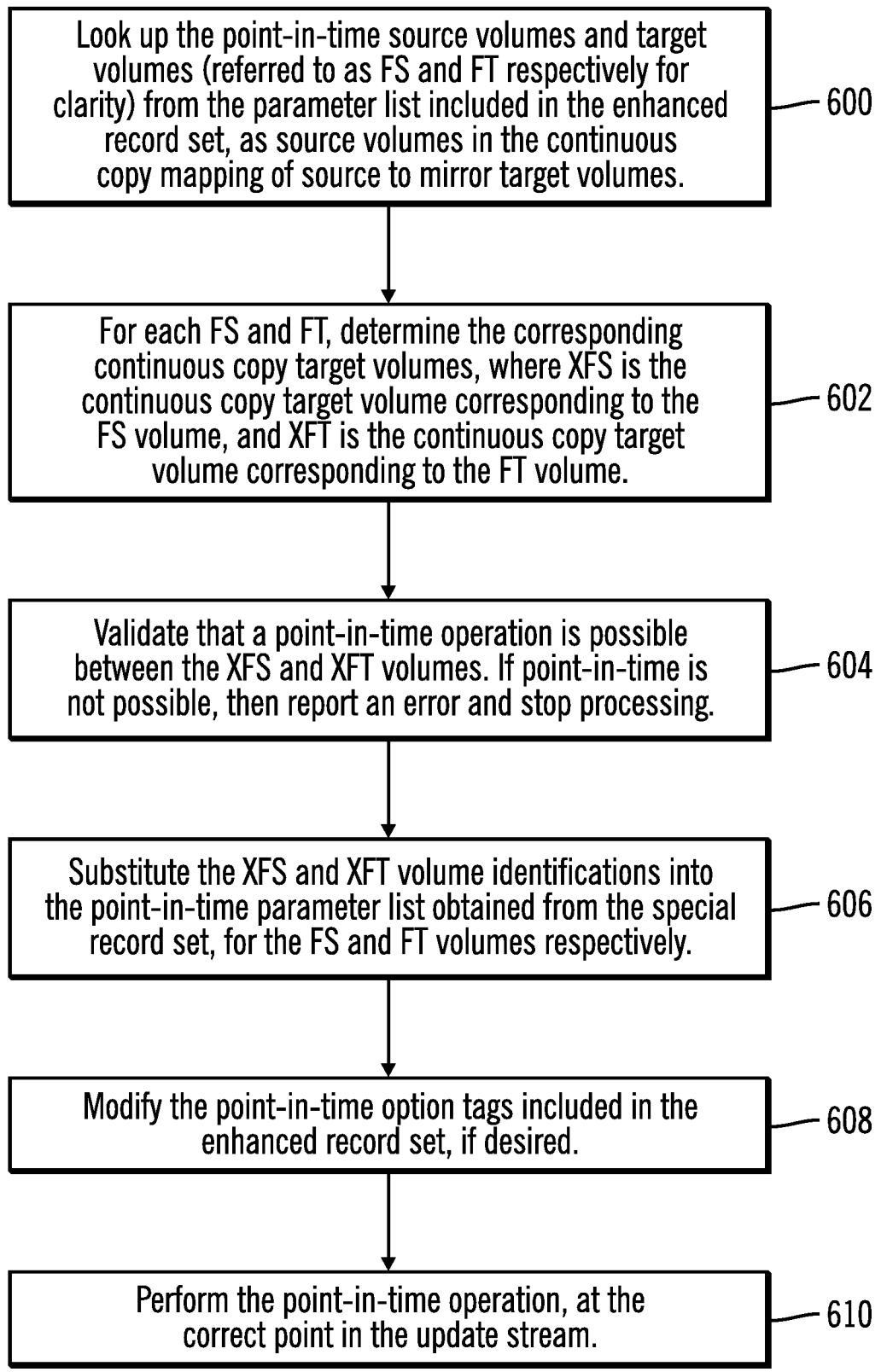
FIG. 6 illustrates third operations for performing point-in-time copy operations in continuous copy mirroring environments, in accordance with certain embodiments.

FIG. 6 illustrates third operations for performing point-in-time copy operations in continuous copy mirroring environments as implemented in the storage manager application 106 of the computing environment 100, in accordance with certain embodiments.

FIG. 6 shows how changes to continuous copy data updates are made in certain embodiments. In certain embodiments, when a continuous copy target data update module implemented as part of the storage manager application 106 encounters an enhanced record set 502 identified by the TIF fields 510 described in FIG. 5, instead of writing data to the target volume identified in the record set the target data update module performs a point-in-time copy operation steps as follows:

1. Look up the point-in-time source and target volumes (referred to as FS and FT respectively for clarity) from the parameter list 518 included in the enhanced record set 502, as source volumes in the continuous copy mapping of source to mirror target volumes (at block 600).
2. For each of FS and FT, determine the corresponding continuous copy target volumes, where XFS is the continuous copy target corresponding to the FS volume, and XFT is the continuous copy target volume corresponding to the FT volume (at block 602).
3. Validate that a point-in-time copy operation is possible between the XFS and XFT volumes. If a point-in-time copy operation is not possible, then report an error and stop processing (at block 604).
4. Substitute the XFS and XFT volume identifications into the parameter list 518 obtained from the enhanced record set 502, for the FS and FT volumes respectively (at block 606).
5. Modify the point-in-time option tags contained in the record set, if desired. For example, an operation which was originally NOCOPY may be executed as COPY. This step may be performed following a standard mapping of operations to mirrored operations, or by using a user-specified parameter or other mechanism for providing a dynamic mapping (at block 608).
6. Perform the point-in-time copy operation, at the correct point in the update stream (at block 610).

In certain embodiments, to facilitate good performance of the mirroring functions, the above steps 1-5 may be performed ahead of time.

While the above is described in terms of point-in-time copy operations and continuous copy operations using some exemplary data structures (such as enhanced record sets 502), alternative embodiments could be applied to point-in-time and continuous mirror functions with different data structures.

In certain embodiments performing the point-in-time copy operations on the continuous copy target volumes allows the point-in-time copy of the point-in-time source volume to be made to the point-in-time target volume without directly copying the point-in-time source volume to the point-in-time target volume. Data consistency is maintained during the execution of the continuous copy operations. The point-in-copy commands are executed while retaining data consistency during an execution of the continuous copy operations and without freezing the continuous copy source volumes.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc.

The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAW) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 7:
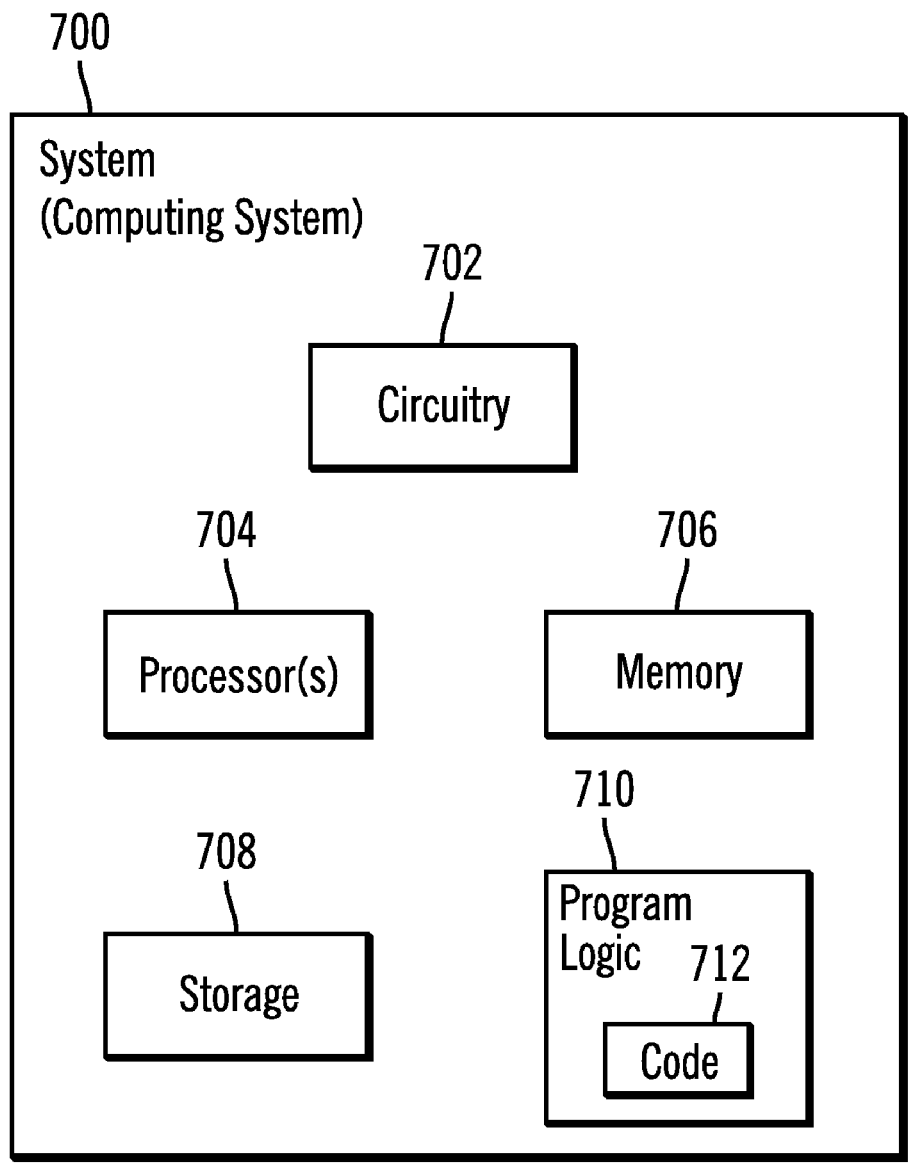
FIG. 7 illustrates a block diagram of a computer architecture in which certain described aspects of the embodiments are implemented.

FIG. 7 illustrates the architecture of computing system 700, wherein in certain embodiments the host 102 and the storage controller 104 of the computing environment 100 of FIG. 1 may be implemented in accordance with the architecture of the computing system 700. The computing system 700 may also be referred to as a system, and may include a circuitry 702 that may in certain embodiments include a processor 704. The system 700 may also include a memory 706 (e.g., a volatile memory device), and storage 708. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-7 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
    receiving a point-in-time copy operation command for a point-in-time copy of a point-in-time source volume to a point-in-time target volume while performing continuous copy operations from continuous copy source volumes to continuous copy target volumes via a continuous copy operation command;
    determining whether the point-in-time target volume is a first continuous copy source volume and whether the point-in-time source volume is a second continuous copy source volume;
    determining metadata corresponding to the point-in-time copy operation, in response to determining that the point-in-time target volume is the first continuous copy source volume and the point-in-time source volume is the second continuous copy source volume;
    generating, by a storage manager application, an enhanced continuous copy operation command by augmenting the continuous copy operation command with the determined metadata corresponding to the point-in-time copy operation; and
    applying the enhanced continuous copy operation command to perform point-in-time copy operations on the continuous copy target volumes based on the determined metadata to execute the point-in-time copy operation command while performing the continuous copy operations.

2. The method of claim 1, wherein performing the point-in-time copy operations on the continuous copy target volumes allows the point-in-time copy of the point-in-time source volume to be made to the point-in-time target volume without directly copying the point-in-time source volume to the point-in-time target volume.

3. The method of claim 1, wherein data consistency is maintained during the execution of the continuous copy operations, and wherein the point-in-time copy operation command for a point-in-time copy of a point-in-time source volume to a point-in-time target volume is executed as a result of the performing of the point-in-time copy operations on the continuous copy target volumes.

4. The method of claim 1, wherein the metadata includes an identification of the point-in-time source volume, an identification of the point-in-time target volume, and extent information corresponding to the point-in-time source volume and the point-in-time target volume.

5. The method of claim 1, wherein the point-in-copy command is executed while retaining data consistency during an execution of the continuous copy operations without freezing the continuous copy source volumes.

6. A system, comprising:
    memory; and
    processor coupled to the memory, wherein the processor performs operations, the operations comprising:
    (i) receiving a point-in-time copy operation command for a point-in-time copy of a point-in-time source volume to a point-in-time target volume while performing continuous copy operations from continuous copy source volumes to continuous copy target volumes via a continuous copy operation command;
    (ii) determining whether the point-in-time target volume is a first continuous copy source volume and whether the point-in-time source volume is a second continuous copy source volume;
    (iii) determining metadata corresponding to the point-in-time copy operation, in response to determining that the point-in-time target volume is the first continuous copy source volume and the point-in-time source volume is the second continuous copy source volume;
    (iv) generating, by a storage manager application, an enhanced continuous copy operation command by augmenting the continuous copy operation command with the determined metadata corresponding to the point-in-time copy operation; and
    (v) applying the enhanced continuous copy operation command to perform point-in-time copy operations on the continuous copy target volumes based on the determined metadata to execute the point-in-time copy operation command while performing the continuous copy operations.

7. The system of claim 6, wherein performing the point-in-time copy operations on the continuous copy target volumes allows the point-in-time copy of the point-in-time source volume to be made to the point-in-time target volume without directly copying the point-in-time source volume to the point-in-time target volume.

8. The system of claim 6, wherein data consistency is maintained during the execution of the continuous copy operations, and wherein the point-in-time copy operation command for a point-in-time copy of a point-in-time source volume to a point-in-time target volume is executed as a result of the performing of the point-in-time copy operations on the continuous copy target volumes.

9. The system of claim 6, wherein the metadata includes an identification of the point-in-time source volume, an identification of the point-in-time target volume, and extent information corresponding to the point-in-time source volume and the point-in-time target volume.

10. The system of claim 6, wherein the point-in-copy command is executed while retaining data consistency during an execution of the continuous copy operations without freezing the continuous copy source volumes.

11. A computer readable storage medium, wherein code stored in the computer readable storage medium when executed by a machine causes operations to be performed, the operations comprising:
    receiving a point-in-time copy operation command for a point-in-time copy of a point-in-time source volume to a point-in-time target volume while performing continuous copy operations from continuous copy source volumes to continuous copy target volumes via a continuous copy operation command;
    determining whether the point-in-time target volume is a first continuous copy source volume and whether the point-in-time source volume is a second continuous copy source volume;
    determining metadata corresponding to the point-in-time copy operation, in response to determining that the point-in-time target volume is the first continuous copy source volume and the point-in-time source volume is the second continuous copy source volume;
    generating, by a storage manager application, an enhanced continuous copy operation command by augmenting the continuous copy operation command with the determined metadata corresponding to the point-in-time copy operation; and
    applying the enhanced continuous copy operation command to perform point-in-time copy operations on the continuous copy target volumes based on the determined metadata to execute the point-in-time copy operation command while performing the continuous copy operations.

12. The computer readable storage medium of claim 11, wherein performing the point-in-time copy operations on the continuous copy target volumes allows the point-in-time copy of the point-in-time source volume to be made to the point-in-time target volume without directly copying the point-in-time source volume to the point-in-time target volume.

13. The computer readable storage medium of claim 11, wherein data consistency is maintained during the execution of the continuous copy operations, and wherein the point-in-time copy operation command for a point-in-time copy of a point-in-time source volume to a point-in-time target volume is executed as a result of the performing of the point-in-time copy operations on the continuous copy target volumes.

14. The computer readable storage medium of claim 11, wherein the metadata includes an identification of the point-in-time source volume, an identification of the point-in-time target volume, and extent information corresponding to the point-in-time source volume and the point-in-time target volume.

15. The computer readable storage medium of claim 11, wherein the point-in-copy command is executed while retaining data consistency during an execution of the continuous copy operations without freezing the continuous copy source volumes.

16. A method for deploying computing infrastructure, comprising integrating computer-readable code into a computer, wherein the code in combination with the computer is capable of performing:

receiving a point-in-time copy operation command for a point-in-time copy of a point-in-time source volume to a point-in-time target volume while performing continuous copy operations from continuous copy source volumes to continuous copy target volumes via a continuous copy operation command;

determining whether the point-in-time target volume is a first continuous copy source volume and whether the point-in-time source volume is a second continuous copy source volume;

determining metadata corresponding to the point-in-time copy operation, in response to determining that the point-in-time target volume is the first continuous copy source volume and the point-in-time source volume is the second continuous copy source volume;

generating, by a storage manager application, an enhanced continuous copy operation command by augmenting the continuous copy operation command with the determined metadata corresponding to the point-in-time copy operation; and applying the enhanced continuous copy operation command to perform point-in-time copy operations on the continuous copy target volumes based on the determined metadata to execute the point-in-time copy operation command while performing the continuous copy operations.

17. The method for deploying computing infrastructure of claim 16, wherein performing the point-in-time copy operations on the continuous copy target volumes allows the point-in-time copy of the point-in-time source volume to be made to the point-in-time target volume without directly copying the point-in-time source volume to the point-in-time target volume.

18. The method for deploying computing infrastructure of claim 16, wherein data consistency is maintained during the execution of the continuous copy operations, and wherein the point-in-time copy operation command for a point-in-time copy of a point-in-time source volume to a point-in-time target volume is executed as a result of the performing of the point-in-time copy operations on the continuous copy target volumes.

19. The method for deploying computing infrastructure of claim 16, wherein the metadata includes an identification of the point-in-time source volume, an identification of the point-in-time target volume, and extent information corresponding to the point-in-time source volume and the point-in-time target volume.

20. The method for deploying computing infrastructure of claim 16, wherein the point-in-copy command is executed while retaining data consistency during an execution of the continuous copy operations without freezing the continuous copy source volumes.

* * * * *